Dec. 17, 1968 J. A. MAUL ET AL 3,416,441

DATA RECORDER

Filed March 7, 1966 6 Sheets-Sheet 1

INVENTORS.
JOHN A. MAUL
RALPH B. PORTER
JACK G. NANTZ
BY Russell L. Root
ATTORNEY.

Dec. 17, 1968 J. A. MAUL ETAL 3,416,441

DATA RECORDER

Filed March 7, 1966 6 Sheets-Sheet 2

INVENTORS.
JOHN A. MAUL
RALPH B. PORTER
JACK G. NANTZ
BY Russell L. Root
ATTORNEY.

INVENTORS.
JOHN A. MAUL
RALPH B. PORTER
JACK G. NANTZ
BY Russell L. Root
ATTORNEY.

Dec. 17, 1968 J. A. MAUL ET AL 3,416,441

DATA RECORDER

Filed March 7, 1966 6 Sheets-Sheet 4

INVENTORS.
JOHN A. MAUL
RALPH B. PORTER
JACK G. NANTZ
BY Russell L. Root
ATTORNEY.

INVENTORS.
JOHN A. MAUL
RALPH B. PORTER
JACK G. NANTZ
BY Russell L. Root
ATTORNEY.

INVENTORS.
JOHN A. MAUL
RALPH B. PORTER
JACK G. NANTZ
BY Russell L. Root
ATTORNEY.

United States Patent Office 3,416,441
Patented Dec. 17, 1968

3,416,441

DATA RECORDER

John A. Maul, Lyndhurst, Ralph B. Porter, Timberlake, and Jack G. Nantz, Euclid, Ohio, assignors to Addressograph-Multigraph Corporation, Cleveland, Ohio, a corporation of Delaware Filed Mar. 7, 1966, Ser. No. 532,288
7 Claims. (Cl. 101—56)

ABSTRACT OF THE DISCLOSURE

A printing machine in which two operative sections close together to clamp a printing token, and a form to be imprinted, into the machine. One machine portion carries a roller platen device which sweeps back and forth in a given area to apply pressure to any stack of a printing token and form that is held at that plane of action. The printing token is mechanically loaded at a remote station and injected into position. It is then mechanically returned to the original loading station. The mechanical placement is to assure correct location of the printing device with respect to the machine and eliminate human judgment from such positioning.

This invention relates to data imprinters or recorders in general, and more particularly to a data imprinter for mechanical placement of a printing token in proper printing relationship with respect to a closable stack containing a form, a ribbon, a back-up anvil, and an impression platen.

Data recorders for human dicipering, such as those commonly employed in gas stations and department stores, employ printing tokens in the form of embossed plastic cards which are known as direct, or right reading, embossed cards. That is, these cards can be read from the embossed surface.

The card is placed on an anvil and a form to be imprinted is placed over the card. Then, an inked platen is rolled over the card and an impression is made which is quite easily read by the human eye.

With the development of MICR machine reading, for example, a much more uniform and sharp impression became a prime requisite. To serve such purpose, a printing token is generally provided with the embossed characters having the form of printing type, popularly referred to as "reverse reading." Such cards can be best deciphered by the human eye by filling the impressions on the back of the card with coloring matter and reading from the recessed impression side.

This token of the reverse reading kind is placed on an anvil, an intermediate ink bearing member is placed over the face of the token, and a form to be imprinted is placed over the intermediate ink bearing member. An impression made on the form, then, is a direct impression with only a diaphanous ink bearing member between the type and the image receiving surface. There is no substantial intermediate layer of fibrous material, such as the body of the form or other stock, causing the impression to become dispersed and unclear. The ink bearing member or carbon sheet is frequently furnished as one sheet of a multi-part form with the carbon paper designed to be detached and discarded after the impression.

One aspect of the problem involved is that the provision of a full sheet of expensive magnetic carbon paper with each form incurs excess cost. To reduce this cost, it is generally preferable to use a spool of inked ribbon and to feed that ribbon in increments just sufficient to provide a fresh surface for the particular line which must be read by machine.

Those who are not mechanically inclined and are untrained have had difficulty with prior devices used for placing embossed cards in the correct position for making such imprinted impressions. It is the general object of this invention to provide apparatus for making such impressions from tokens, which apparatus may be used by an untrained person, even to the extent that it is so removed from human control that the apparatus may be made available even to the general public.

Therefor, an object of this invention is to provide a mechanical data recorder requiring a minimum of human skill for correct stacking of a printing token and form on opposite sides of a pressure release ink ribbon.

A more specific object of this invention is to provide an anvil and form locator closable together upon a ribbon passing between them, a shuttle carriage accessible to an operator for accepting a printing token and mechanically projecting the token into a superposed stacked relationship with the locator and anvil, and returning the card after an impression is taken.

In accordance with these and other objects which will become apparent hereinafter, the best mode contemplated for the present invention is disclosed in the accompanying drawings wherein.

Figure 1:
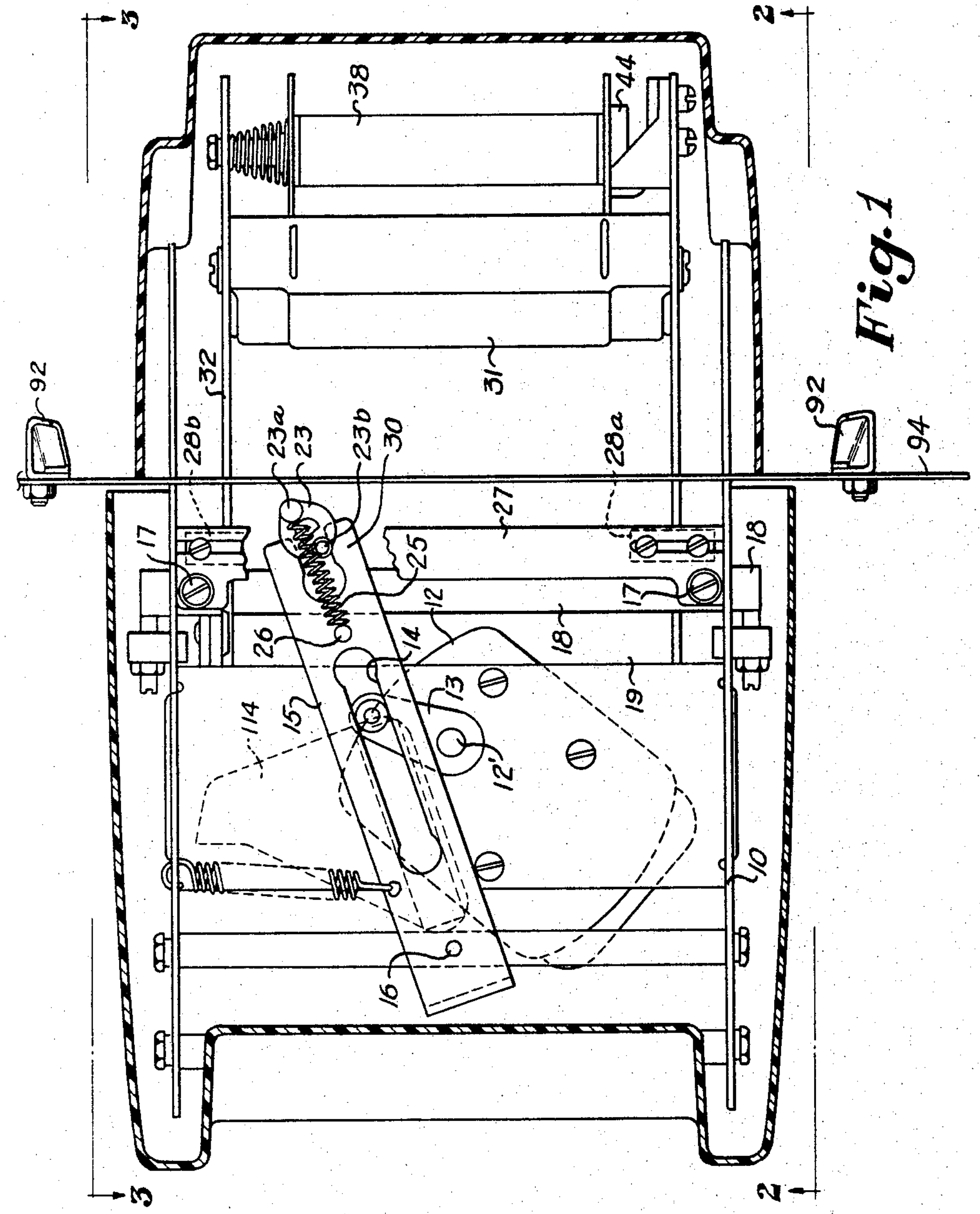
FIGURE 1 is a top plan view, with the housing broken away, of a data recorder embodying the present invention.

Referring to the drawing, a data imprinter or recorder according to the invention embodies a frame 10 upon which is mounted an electric motor 12 whose shaft 12' drives a crank arm 13 engaged in a slot 14 of a C-frame 15 pivoted as at 16 to the frame for swinging movement responsive to the crank arm rotation.

Figure 2:
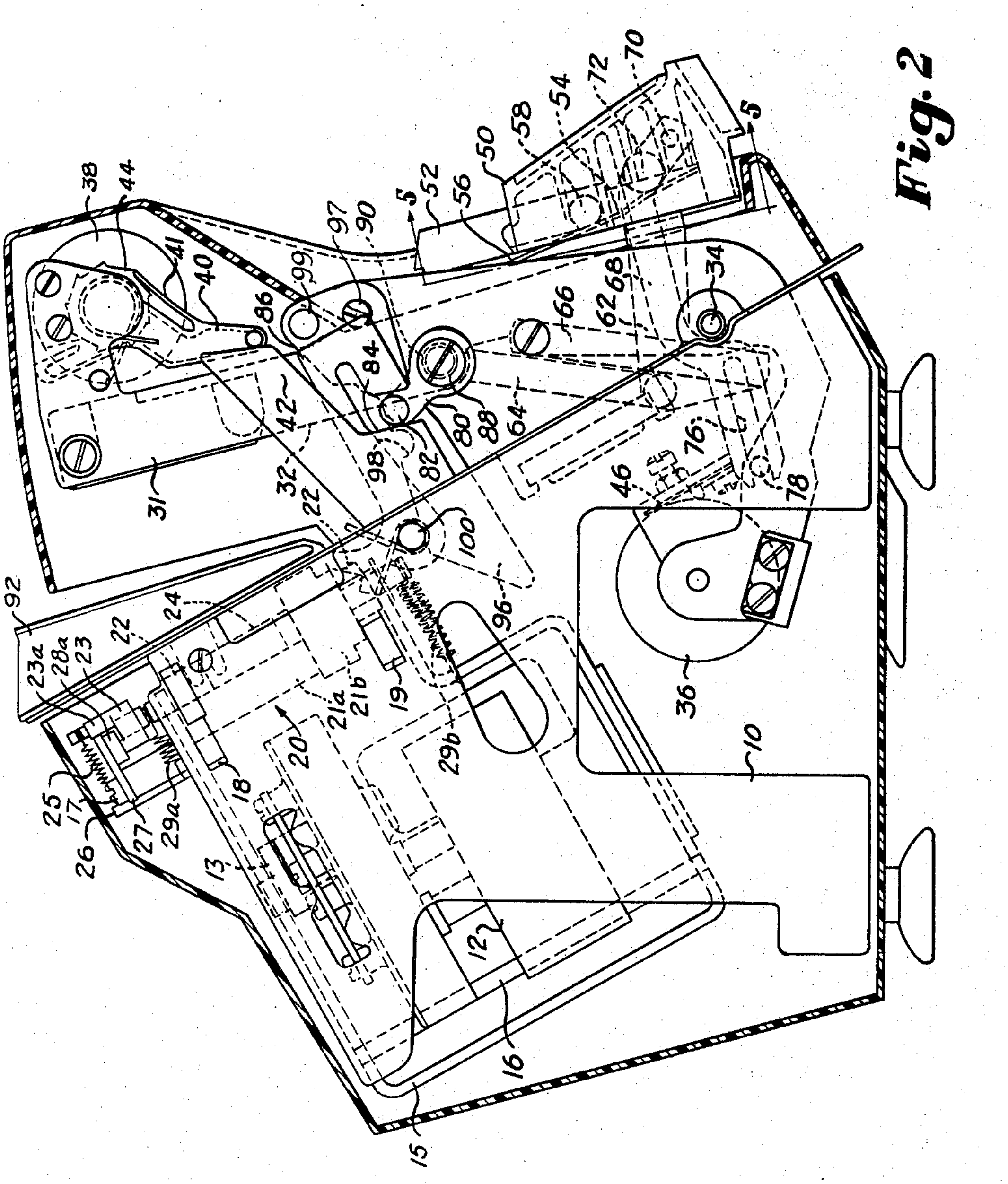
FIGURE 2 is a side elevation, with the housing broken away, taken on line 2—2 of FIGURE 1.

As best shown in FIGURES 1 and 2, a pair of vertically spaced tracks 18 and 19 are employed to guide the movement of a roller platen assembly 20. The assembly includes a central vertical shaft 24 carrying spaced roller bearings 22 which are positioned to roll along the tracks 18 and 19. As seen best in FIGURE 4, the shaft has eccentric portions which carry roller platens **21*a* and 21*b*. The shaft 24 is essentially non-rotatable, but can be turned through a small angle to two positions such that either platen 21*a* or platen 21*b* is projected by its eccentric shaft portion to a printing position. The position of shaft 24 is determined by a collar 23 on its upper end carrying a guide pin 23*a* and an actuator 23*b*. A tension spring 25 connects the guide pin 23*a* with a perch 26 on the upper arm of the C-frame 15, in an over-center manner so that either one side or the other of guide pin 23*a* is drawn against a track 27. Lock 27** is broken away in FIGURE 1 to better reveal this structure. Abutments 28*a* and 28*b* at the ends of track 27 (FIGURE 1) are positioned to engage the actuator 23*b* at either end of the platen travel to shift shaft 24 so as to project either platen 21*b* or platen 21*a*.

It will be noted that the actuator 23*b* leads the collar 23 as it moves along the track 27, and the guide pin 23*a* is so related thereto that it trails the collar 23 on the side of the track 27 towards the printing situs in each direction. This is significant because the relationship of the parts is thus such that the effect of rotational friction of the rolling platen on shaft 24 tends to hold the guide pin 23*a* against the track 27 rather than tending to work against the over-center spring and perhaps cause an inadvertent platen reversal in mid stroke. Another aspect of the arrangement which appears significant is the direct mounting of the track 27 on track 18 by means of stud post 17. Post 17 is shown as a screw passing through the track 27 and threaded into track 18. A spacing collar, having no reference number, surrounds the post 17 between the two tracks. When track 18 is adjusted to give correct printing pressures, the track 27 has imparted to it exactly corresponding movement which thereby leaves the activating pressure angles on pin 23*a* and actuator 23*b* at their precise optimum values.

Motion of the platen assembly 20 along its tracks 18 and 19 is produced by the C-frame 15 which has upper and lower bifurcated ends embracing the upper and lower ends of shaft 24. Shaft 24 is retained in the slotted end of frame 15 against the tracks 18 and 19 by tension springs 29*a* and 29*b* (FIGURE 2). One of these bifurcated ends is indicated at 30 in FIGURE 1.

From the foregoing it can be seen that the platen assembly 20, as it is swept back and forth by the C-frame 15, determines a printing situs, one area of which is defined by the platen 21*a* when it is extended and another area of which is defined by the platen 21*b* when it is extended.

For cooperation with the platen assembly 20 there is provided an anvil 31 which is movably carried by an anvil support or frame 32 pivoted to the main frame 10 at 34 so as to provide for movement of the anvil 31 to and from the printing situs.

Figure 4:
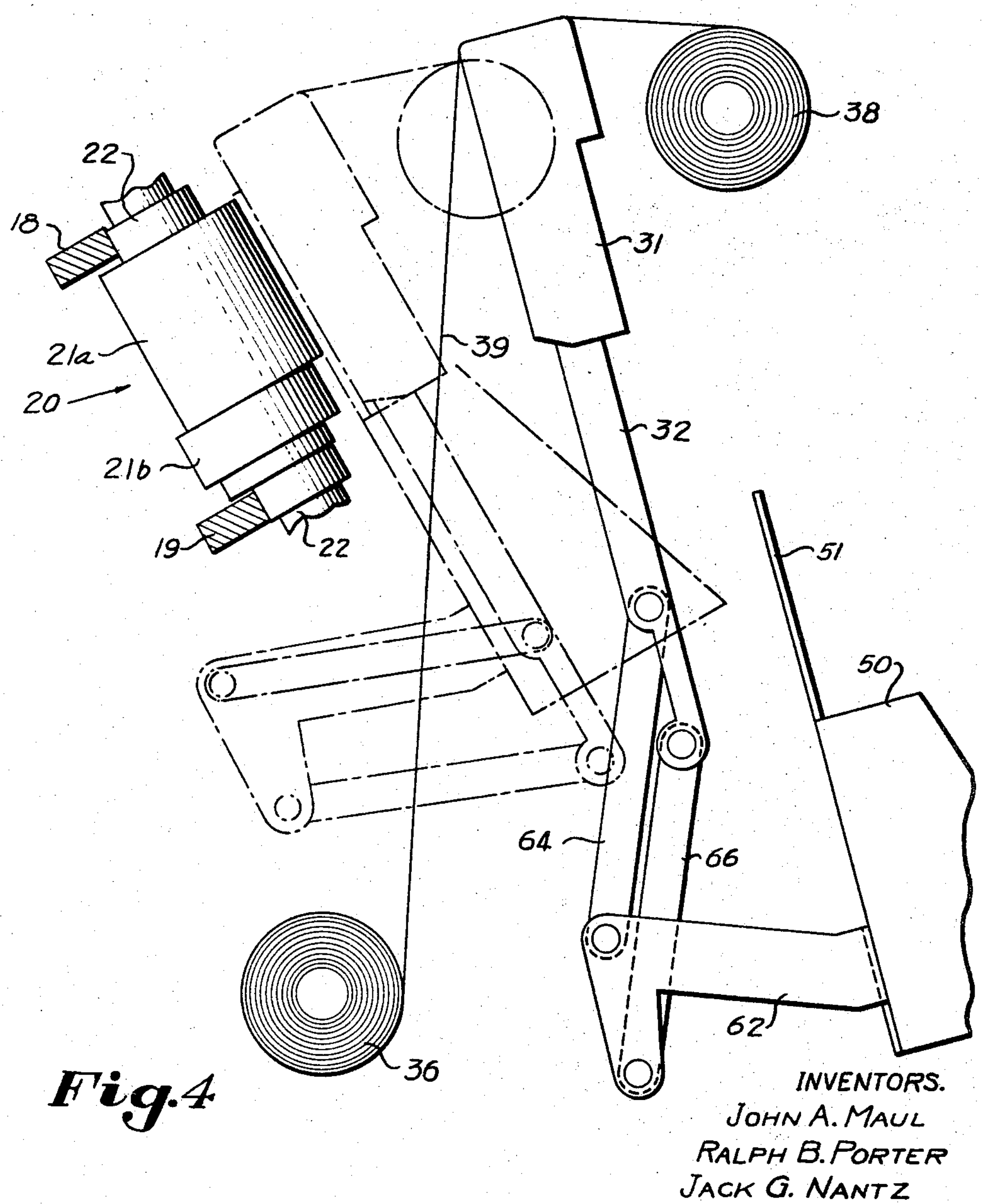
FIGURE 4 is a schematic side elevation illustrating the cooperating relationship of a roller platen, a swingable anvil with a ribbon dividing the space therebetween, and a shuttle carriage shown at rest in full lines, and actuated in dotted outline.

In order to provide a supply of transfer material such as carbon paper ribbon, the extremities of the anvil support are arranged to carry a ribbon supply spool 36 and a ribbon takeup spool 38. As best seen in FIGURE 4, there is a reach of ribbon 39 running between the spools which is so trained as to pass between the platen assembly 20 and the anvil 31.

The reach of ribbon extends in an angular path to divide the space between the printing situs and anvil 31, leaving a space between the ribbon and anvil. This space is used to provide access for insertion of a printing token.

The ribbon is preferably arranged to feed mechanically in response to machine operation, and to this end there is provided on the takeup spool 38 a ratchet 44 cooperable with a drive pawl 41 on an arm 40 which is arranged to strike an abutment 42 each time the anvil 31 swings towards printing position to thereby effect an increment of ribbon advance. The supply spool 36 is controlled by a friction brake 46 (FIGURE 2) and also preferably embodies a friction rewind spring (not shown) to keep the ribbon reach 39 taut at all times.

Figure 3:
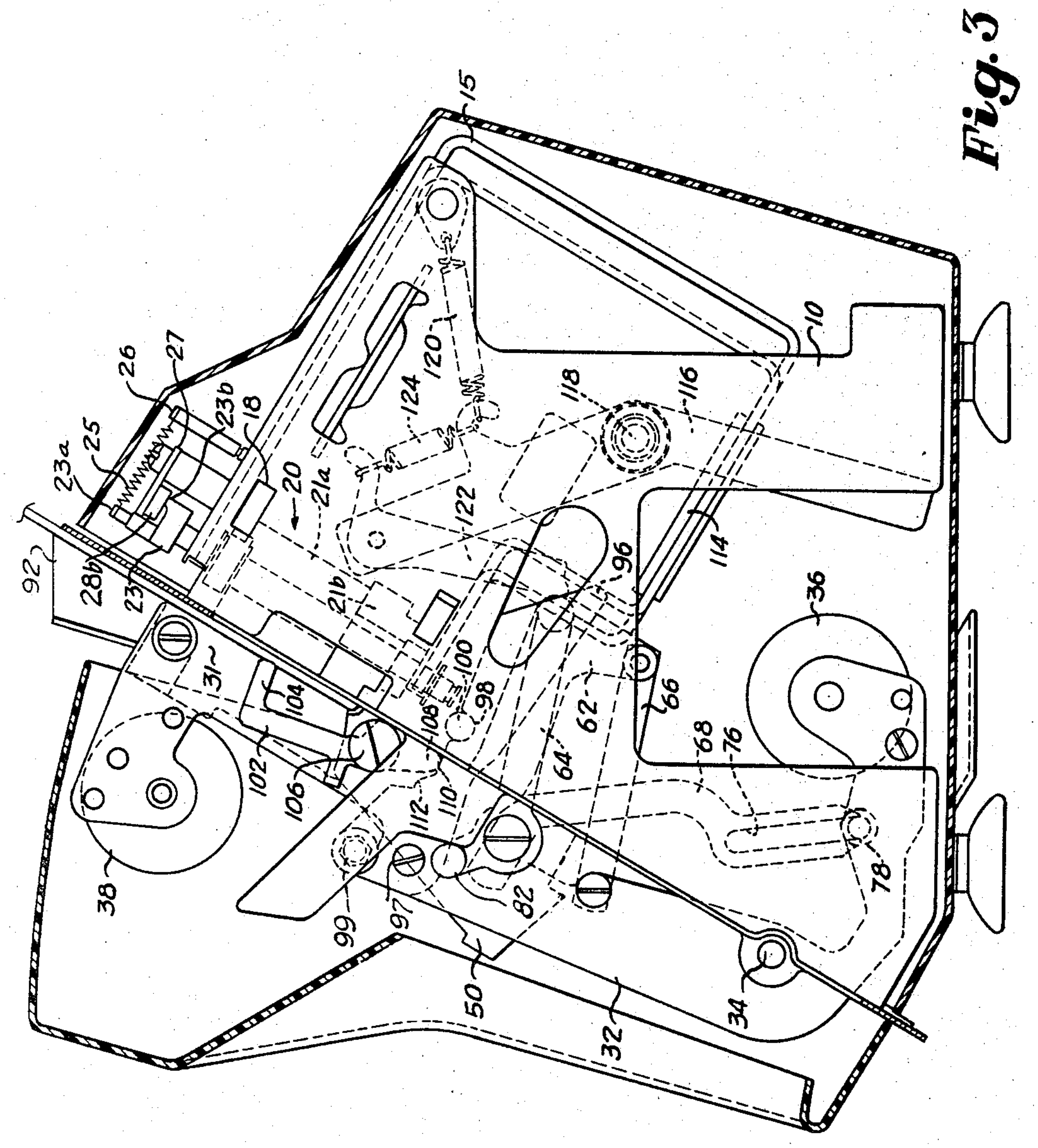
FIGURE 3 is a side elevation, with the housing broken away, taken on line 3—3 of FIGURE 1, but with the parts in an actuated relationship for taking an impression.

One of the primary features of this invention relates to means for placing a printing token such as a credit card in operative printing position between the anvil and the ribbon, and there is accordingly provided a shuttle carriage 50 for carrying a token 51 (FIGURE 4) between a loading position shown in FIGURE 2 and in solid lines in FIGURE 4, and a print position shown in FIGURE 3 and in dotted lines in FIGURE 4. No token is shown in FIGURES 1–3.

The shuttle 50 is intended to present a pocket into which the token can be easily dropped in precise location by an operator, and then to grasp the token by a margin and project it into the space between the ribbon reach 39 and the anvil 31.

The condition of the shuttle in loading position is seen in FIGURE 2. As seen in FIGURES 2 and 5–7 the shuttle comprises a pocket defined by retractable end guides 52 and a ledge 53 for receiving the lower token edge. In the form shown, this ledge is provided by a pair of pins inserted in the face of the shuttle. The pocket is completed by gripper fingers 56,56 on a gripper plate 54 (now in open, non-gripping position) which prevents accidental displacement of the token edge from the ledge 53. This pocket provides a place for the operator to drop a token or credit card in a vertical position under circumstances such that gravity will conduct it to a precise location on the shuttle 50 with no particular care or effort on the operator's part. The gripper fingers are extensions of gripper plate 54 rockable on the shuttle 50 by virtue of circular bearing ears 58 received in complementary recesses in the shuttle. Leaf springs 60 urge the plate 54 to the non-gripping position. Means are provided for actuating the grippers as will presently appear.

Figure 8:
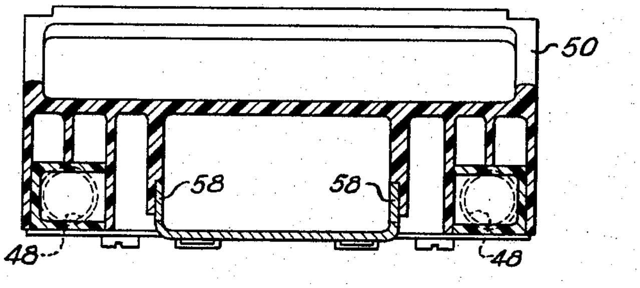
FIGURE 8 is a section taken along 8—8 of FIGURE 5.
Figure 5:
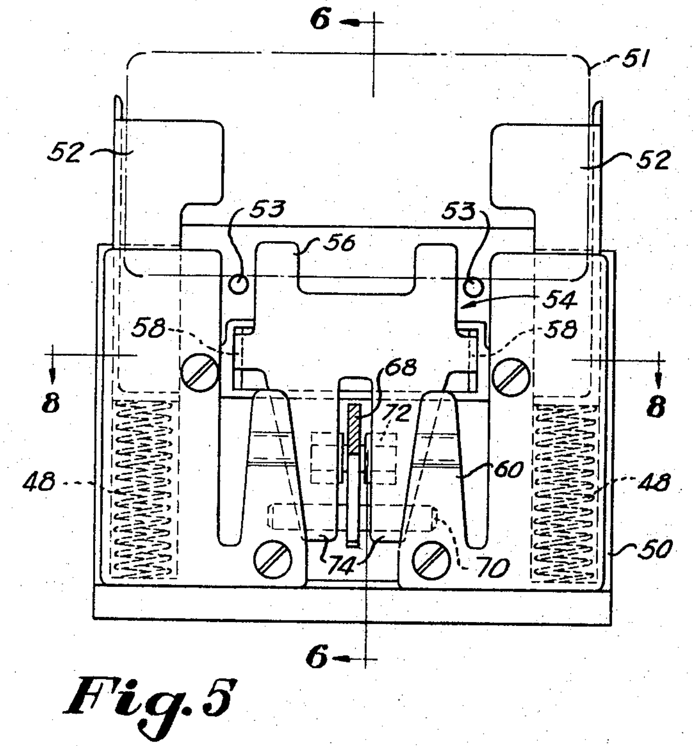
FIGURE 5 is a rear face view of a card shuttle carriage as viewed on line 5—5 of FIGURE 2.
Figures 6, 7:
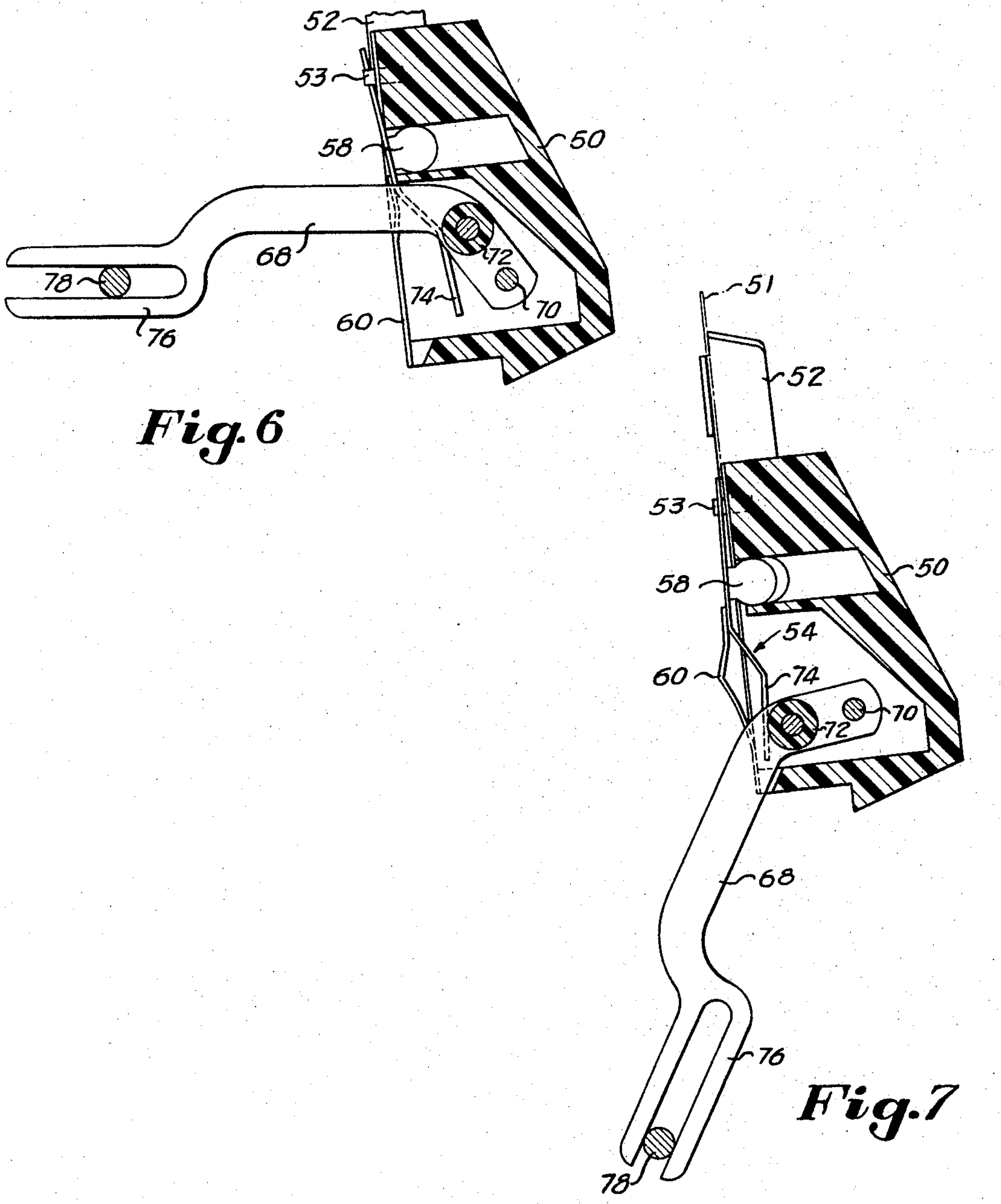
FIGURE 6 is a section taken on line 6—6 of FIGURE 5.
FIGURE 7 is the view similar to FIGURE 6 but showing the parts as actuated to grasp a printing token.

The body of the shuttle 50 is formed with vertical recesses which provide vertical tracks in which the end guide 52 operates. As shown only in FIGURE 5, coil springs 48 urge the guides to the extended position as shown. The vertical track and spring location are also illustrated in FIGURE 8. These guides provide a temporary lateral locator for a token 51 in order to avoid the necessity for an operator to observe any marking or exercise any judgment. Then, as the shuttle 50 moves inwardly and upwardly to the dotted outline position shown in FIGURE 4, the end guides 52 strike the bottom of the anvil 31 and are caused to retract into the recesses of the shuttle 50 as the shuttle advances to the printing position. Thus, the guides are stripped back out of the way and the token is presented without obstruction, held only by gripper fingers 56.

The shuttle has a cantilever support consisting of a pair of side brackets 62,62. See FIGURES 2 and 3. Each of these side brackets at its end remote from the shuttle is connected to the anvil frame by a parallel bar linkage including links 64 and 66, so that the shuttle 50 can swing in a curved path, but parallel to itself, from the solid line position to the dotted line position in FIGURE 4. While this motion is presently being discussed primarily with respect to the anvil frame, it will be understood that the anvil frame may also undergo a degree of simultaneous movement as will presently appear.

Associated with the shuttle 50 is a gripper actuating lever 68 which is pivoted to the shuttle at 70. The lever carries rollers 72,72 which can engage against an operating portion 74 of the gripper plate 54, and projects to a point within the main frame where it has a slotted end 76 slidably engageable with a fixed tie rod 78. As the shuttle 50 moves away from loading position, the first increment of movement causes the lever 68 to swing anticlockwise (FIGURE 2) with respect to the shuttle so that rollers 72 promptly swing the gripper plate to close the gripper fingers 56 tightly on the margin of a token held in the shuttle in opposition to the force of springs 60. Continued upward motion maintains the grippers in this position where they remain until the shuttle approaches loading position during its downward travel.

It should be noted that as the shuttle moves upwardly towards the bottom of the anvil 31, the end guides 52 strike the under surface of the anvil and consequently are forced to retract downwardly into the anvil so that the token is projected freely upwardly between the anvil 31 and the overlying ribbon reach 39.

Provision is made for a coaction between the shuttle raising and anvil closing motions in that the uppermost link 64 of the parallel bar linkage on one side of the machine includes an arm 80 projecting at an angle to the link and carrying a roller 82 riding against a reaction surface 84 on the abutment member 42 affixed to the frame 10. Thus, whenever the shuttle 50 is raised the roller 82 reacts against the surface 84 and, acting about the linkage pivot (designated 88), draws the anvil frame 32 towards the platen assembly by causing the same to swing about its pivot 34. Full upward motion of the shuttle 50 causes the frame 32 to place the anvil 31 at the printing situs as defined by the path of the platen assembly. Preferably the pivot 88 also has associated with it a torsion spring 90 which acts in a direction tending to return the anvil to retracted position and the shuttle to loading position.

Located at the printing situs are two laterally positioned gauges 92 which will place a form to be imprinted with accuracy when the operator drops the form into the gauge. Gauges 92 are triangular, closed end, trough shaped members seen in elevation in FIGURE 2 and top plan in FIGURE 1. They are held by form support bed 94.

When the anvil 31 has been moved to the printing situs it must be held firmly in this position while the platen stroke is in progress to withstand the printing forces involved, and this is accomplished by providing two latch arms 96 coupled together and pivoted as a unit on the anvil frame 32, one arm at each side thereof. In FIGURE 2, a pivot bolt 97 is shown as the means to join the arm 96, on one side, to the frame 32. Pivot 97 is shown in FIGURE 3 hidden behind the abutment 42. FIGURE 3 is the actuated position. A cross-arm bar 99 is used to couple the latch arms 96 and cause them to operate as a unit. Each latch arm has a notch 98 designed for engagement with a tie rod 100 on the frame 10 when the anvil 31 is in print position. Torsion spring means, not shown, urge the latches upwardly towards engaged position. One of the latches is also preferably arranged to close a switch in the circuit of motor 12 to initiate a printing cycle.

The device of the present invention is equipped with means to prevent operation if a form is not present, since a printing impression on the platen rollers could offset onto the backs of subsequent forms which, in the case of magnetic material would destroy their usefulness for machine reading. This prevention of operation is accomplished as shown in FIGURE 3 by providing, pivotally mounted on the anvil frame 32, a sensor latch 102 having a feeler finger 104 which will be held in the FIGURE 3 position by a form if present, but which will project beyond the printing plane to a no-form position if the form is absent. The other end of latch 102 has an abutment 108 which will coact with a catch abutment configuration 112 on one of the latches 96 to block it from moving to latched position whenever the sensor latch is in no-form position, but will lie opposite a relief area 110 (as shown in FIGURE 3) allowing normal latch operation when in the form present position.

In order to provide a mechanical release and return of the parts upon completion of a printing cycle, the device embodies a release pusher 114 affixed to the bottom arm of C-frame 15 (see FIGURES 1 and 3). This coacts with a latch release mechanism which is shown only in FIGURE 3 in elevation, and not in the FIGURE 1, where the mechanism has been eliminated for clarity of the remaining essential portion of illustration. The release mechanism comprises release lever 116 pivoted to frame 10 at 118 and urged clockwise by a spring 120. At its active end it carries a pawl 122 urged in one direction by a spring 124. It can be seen that with the parts in the position shown in FIGURE 3, the incoming latch 96 thrusts the pawl aside against the force of spring 124. However, when a printing cycle has started the pusher 114 releases the lever 116 which moves clockwise allowing the pawl 122 to snap over the crown of the latch 96. Then when the C-frame returns to home position the pusher 114 moves the release lever anticlockwise thus lowering the pawl 122 and releasing the latch, which simultaneously deenergizes motor 12.

In operation of the device, an operator drops a token 51 into the shuttle 50 and a form into the gauge 92. He then raises the shuttle which simultaneously places the token between the anvil 31 and the ribbon 39, and moves the anvil into the printing situs to provide between it and the platen a stack including a form, the carbon ribbon 39 and a token 51 in intimate relationship ready for an impression.

As the anvil moves to print position, the latches 96 go into operation to provide a reaction point for the movable anvil, and the motor 12 is energized. This moves the C-frame once across the printing situs and back again, the first time with the platen 21*a* extended, and on the return trip with the platen 21*b* extended. As the platen assembly 20 returns to home position the pusher 114 releases the latch mechanism as heretofore described, allowing the platen to return to retracted position and the shuttle to move to loading position wherein the token is accessible for replacement.

It should be understood that the specific machine herein described is adapted for making impressions designed for machine reading. As such, the token will normally be embossed with a single line of characters such as MICR at a level to cooperate with the short platen 21*b*, while the impression from the balance of the lines will be taken by the long platen 21*a*. By taking the impressions individually, and making an impression of the machine read characters by rolling a platen lengthwise of the line, one character at a time, without interference or pressure disturbances from adjacent lines, a high degree of character outline quality can be achieved even with embossed tokens, so that the machine readability of the output proves to be eminently practical.

Whereas the present invention has been shown and described herein in what is conceived to be the best mode contemplated, it is recognized that departures may be made therefrom within the scope of the invention which is, therefore, not to be limited to the details disclosed herein, but is to be afforded the full scope of the invention as hereinafter claimed.

What is claimed is:

1. In a data recorder having holding means for a form to be imprinted, a pressure backing anvil spaced from said holding means, and an ink bearing ribbon dividing the space between said holding means and anvil, the provision of a mechanical means for accurately positioning a printing token for taking an impression thereof, comprising:

a printing token shuttle, grip means for clamping a printing token to said shuttle in a position projecting free of obstruction, and shuttle guide means for providing a shuttle path between a print position wherein a token held by the shuttle projects to a superposed relationship with said ribbon and holding means, and a remote loading position, said shuttle characterized in that the token is accepted in said loading position and returned thereto at the end of a printing action; and means for closing said holding means and anvil with respect to one another upon a token in said print position and applying an imprinting pressure.

2. A data recorder comprising:

a frame;

platen means comprising at least one roller platen;

means on the frame for shifting the roller platen transversely of its axis to define a printing situs;

means for holding at the printing situs a form to be imprinted;

an anvil movable between an operative position at the printing situs wherein a printing token placed against the anvil will be held in a position to act as a print member in conjunction with said roller platen acting as a form roller, and a retracted position;

support means movably connected with the frame and carrying the anvil between said positions;

means for supporting a ribbon with a portion thereof disposed across the anvil between the anvil and said printing situs;

a printing token shuttle for carrying a token in a projecting manner;

means movably mounting the shuttle on the frame for movement between a print position adjacent the printing situs wherein a token held by the shuttle projects between the anvil and the ribbon, and a loading position remote therefrom and accessible for ready loading and unloading of tokens by the operator, said shuttle characterized in that the token is accepted in said loading position and returned thereto at the end of a printing action; and means for coordinating the delivery of a token to said printing position, with a closing movement thereafter of the anvil, and holding of the anvil in closed position until the roller platen has fully traversed the printing situs.

3. A data recorder as set forth in claim 2 in which means is provided for associating the movement of the shuttle with the movement of the anvil support means such that movement of the shuttle towards said print position moves the anvil to said operative position and movement of the shuttle to said loading position moves the anvil to said retracted position; and wherein means is also provided for latching said support means in said anvil operative position.

4. A data recorder as set forth in claim 2 in which the shuttle includes a gripper for grasping a margin of a token and in which means is provided for actuating the gripper to active token grasping position in response to movement of the shuttle from loading position towards said print position, and for actuating the gripper to a token releasing position in response to movement of the shuttle from said print position to said loading position.

5. A data recorder as set forth in claim 2 in which the platen means comprises two roller platens both shiftable by the platen shifting means to define separate areas of the printing situs, and which further includes a shaft with eccentric portions on which the platens are mounted; track means to guide the shaft for motion normal to itself during printing operation; a collar connected to the shaft for controlling its rotary position; a control track disposed adjacent the path of the collar during printing movement with the platen shaft, means on the collar for resting against and sliding along the control track in either of two positions to determine which platen is projected to printing position during the shaft transit; means responsive to movement of the anvil support means to said anvil operative position for triggering operation of the platen shifting means to sweep the platens twice across the printing situs; and means to project one platen to printing position during the first sweep and the other platen during the second sweep.

6. In a data recorder comprising an anvil for holding a printing token with plural rows of characters thereon and means for taking an impression from a first portion of the rows by rolling one roller platen along the rows of said portion and then taking an impression from a second portion by rolling a second roller platen along the rows of said second portion, the improvement in which said impression taking means characterized by a shaft with eccentric portions thereon; a roller platen on each of said eccentric portions; track means to guide the shaft for motion normal to itself during printing operation; power means to sweep the shaft along the track means; a collar connected to the shaft for controlling its rotary position; a control track disposed adjacent the path of the collar during printing movement with the platen shaft and means on the collar for resting against and sliding along the control track in either of two poistions to determine which platen is projected to printing position during the shaft transit.

7. A data recorder as set forth in claim 6 in which there are provided over-center spring means maintaining either of said control positions until disturbed, the relative orientation of the platen rollers, shaft, collar and said means resting against the control track is such that the frictional torque on the shaft exerted by the platen roller during printing is in a direction to urge the last named means toward contact with the control track, and abutment means at the ends of the control track cooperating with means on the collar for shifting the position of the collar at each end of its sweep.

References Cited

UNITED STATES PATENTS

| | | | |
|---|---|---|---|
| 1,532,698 | 4/1925 | Johnson | 101—65 |
| 1,716,942 | 6/1929 | Abrams et al. | 101—56 |
| 1,841,862 | 1/1932 | Thompson et al. | 101—274 |
| 2,664,819 | 1/1954 | Janke | 101—274 |
| 2,797,636 | 7/1957 | Nettle | 101—65 |
| 3,272,120 | 9/1966 | Johnson | 101—269 XR |
| 3,312,162 | 4/1967 | Likens | 101—56 |
| 3,323,628 | 6/1967 | Gollwitzer | 197—6.2 |
| 3,340,800 | 9/1967 | Gruver et al. | 101—269 XR |

ROBERT E. PULFREY, *Primary Examiner.*

C. D. CROWDER, *Assistant Examiner.*

U.S. Cl. X.R.

101—274